United States Patent [19]

Eberhardt et al.

[11] Patent Number: 5,087,464
[45] Date of Patent: Feb. 11, 1992

[54] METHOD FOR PRODUCING MULTI-LAYERED CONFECTIONERY

[75] Inventors: Roland Eberhardt, Rengsdorf; Gerhard Puderbach, Neuwied, both of Fed. Rep. of Germany

[73] Assignee: Winkler & Dunnebier Maschinenfabrik und Eisengiesserei KG, Neuwied, Fed. Rep. of Germany

[21] Appl. No.: 568,482

[22] Filed: Aug. 16, 1990

[30] Foreign Application Priority Data

Aug. 31, 1989 [DE] Fed. Rep. of Germany ....... 3928864

[51] Int. Cl.⁵ .............................................. A23G 3/00
[52] U.S. Cl. .................... 426/231; 99/450.1; 426/512; 426/660
[58] Field of Search ............. 426/231, 512, 660; 99/450.1, 450.2, 450.4

[56] References Cited

U.S. PATENT DOCUMENTS 3,427,649 2/1969 Fay ....................................... 426/512

Primary Examiner—George Yeung
Attorney, Agent, or Firm—Collard, Roe & Galgano

[57] ABSTRACT

The present invention is directed to a method for producing multi-layered confectionery comprising aligning the confectionery on a conveyor system in rows oriented at right angles to the transport direction of movement of the conveyor system; building up the confectionery layer by layer by a first, a second and succeeding applicators for delivering a confectionery mass deposited onto the confectionery the applicators being arranged one behind the other along the transport direction; optically detecting each row of confectionery before the row reaches the second and all succeeding applicators; generating a signal based upon the position of each row relative to the respective applicator; and this signal controlling the spatial position of the applicator and its application time interval in such a way that the delivered mass deposited by the applicator is placed exactly in a predetermined position onto the row of confectionery passing below the applicators.

4 Claims, 1 Drawing Sheet

METHOD FOR PRODUCING MULTI-LAYERED CONFECTIONERY

BACKGROUND OF THE INVENTION

1. Field of the Invention

The present invention relates to a method and to an apparatus suitable for carrying out this method for producing multi-layered confectionery by means of several applicators arranged along a conveyor system.

2. The Prior Art

The most frequently used applicators are extruders, but occasionally, particularly towards the end of the production line, placing devices, such as nut or cherry depositing devices, are also used. The conveyor system is usually constructed as a conveyor belt, or as a conveyor screen, which runs below the applicators. The first applicator produces rows of a first layer, i.e., the "base plates" as it were, of the confectionery to be produced, running at right angles to the conveyor direction. These "base plates" are moved by the conveyor system below a second applicator where the second confectionery layer is applied, and so on until the confectionery is made up of the desired number of layers.

The difficult with this type of confectionery production system is in bringing the individual confectionery layers together so that they are exactly aligned with one another. If this does not happen, then unpleasant looking, crooked or misshapen products are the result. The principal reason for this difficulty is the inaccuracy in the transporting by the conveyor system. This conveyor is constructed as a belt or screen and has a tendency both to shift transversely with respect to the direction of movement and, due to uncontrolled stretching and slippage in the drive mechanism, to fluctuate in its direction of movement. Attempts were made initially to overcome this difficulty by arranging the applicators so that they are moveable relative to the transport system. It was the responsibility of the operating staff to monitor the apparatus continuously. As soon as a crooked or misshaped appearance was observed in the confectionery, it became necessary for the staff to correct the position of the applicators in relation to the displacement of the transport system.

In addition to the high expenditure of energy involved, this attempted solution also had the disadvantage that a correction can only be made after the error has already become visible to the staff; i.e., when the quality of the products has already visibly deteriorated. Therefore, there has been no shortage of attempts to replace, or at least to relieve, the operator by mechanical means at this point. In this case, considerations have concentrated on keeping the conveyor system running straight.

A prior art device is known which detects the straight running of a transport system constructed as a conveyor belt by using a sensor pin which rests against one of the side edges of the belt. This sensor pin acts on a switch which then emits switch pulses when the conveyor belt shifts unacceptably far to the right or to the left. The switch pulses are transmitted to a control arrangement which steers the belt in the opposite direction in order to achieve an acceptable straight line movement for the conveyor belt.

A similar solution is known from DE-OS 3,711,916. In that publication, it is proposed to provide a marking, for instance, in the form of a continuous thread, a coating of varnish or the like, on the surface of the conveyor belt. This marking is scanned by means of sensors which are arranged to the right and left of the marking and act without contacting the marking. Here too the sensors produce control pulses which, in turn, seek to achieve a straight line movement for the conveyor belt by steering it in the reverse direction opposite to its direction from the straight line movement.

It is common to both prior art systems that the lateral deflection of the conveyor belt can only be fully corrected in the region of the sensors. Deviations during the travel movement of the conveyor belt before the sensor, or between the sensor and a guide roller which steers the belt in the opposite direction, are not recognized. Thus, these deviations are not corrected in these prior art systems. Furthermore, displacements caused by slippage, or stretching, of the conveyor belt are also not eliminated. Thus, it is still the responsibility of the operating staff to monitor the apparatus continuously for accuracy in the formation of the confectionery layer and to intervene occasionally so as to correct any misalignment in the layer formation when necessary. Correction is by adjusting the position of the applicators. In the case of displacements of the conveyor belt in the direction of belt travel, correction is also by altering the application time interval of the applicators.

SUMMARY OF THE INVENTION

It is, therefore, the object of the invention to provide a method which, in the production of multi-layered confectionery which is aligned on a conveyor system in rows running at right angles to the direction of movement of this conveyor system and which is built up layer by layer by applicators arranged one behind the other along the transport direction, makes it possible to detect and to automatically correct both fluctuations in the speed of the conveyor system and also shifting movements at right angles to its direction of travel.

The above object is accomplished in accordance with the present invention by providing that each row of confectionery is optically scanned before reaching the next applicator and all succeeding applicators, and that from its position relative to the respective applicator, a signal is generated. This signal controls the spatial position of the applicator and/or its application time interval in such a way that the mass delivered by the applicator is placed exactly in the predetermined position onto the row of confectionery passing below it.

The present invention is directed to a method for producing multi-layered confectionery comprising aligning the confectionery on a conveyor system in rows running at right angles to the transport direction of movement of the conveyor system; building up the confectionery layer by layer by a first, a second and succeeding applicators for delivering a mass deposited onto the confectionery the applicators being arranged one behind the other along the transport direction; optically detecting each row of confectionery before the row reaches the second and all succeeding applicators; generating a signal based upon the position of each row relative to the respective applicator; and this signal controlling the spatial position of the applicator and its application time interval in such a way that the delivered mass deposited by the applicator is placed exactly in a predetermined position onto the row of confectionery passing below the applicators.

The present invention is also directed to an apparatus for producing multi-layered confectionery comprising:

a conveyor system having rows of confectionery thereon at a right angle to the transport direction of the conveyor system; a first, a second and succeeding applicators above the confectionery for coating the confectionery; scanning means located in the inlet region of the second and the succeeding applicators for optical scanning of the position of the rows of the confectionery to be coated; and adjusting means for correcting the position of the applicators to the position of the rows of confectionery.

The advantage of this solution according to the present invention is that the unavoidable fluctuations in the speed and in the direction of travel of the transport system no longer have any influence on the accuracy of the formation of the layers of the confectionery. Therefore, when the method according to the invention is used, it is no longer necessary, as in the past, for an operator to continuously to monitor and to correct the settings.

BRIEF DESCRIPTION OF THE DRAWINGS

Other objects and features of the present invention will become apparent from the following detailed description considered in connection with the accompanying drawing which disclosed two embodiments of the present invention. It should be understood, however, that the drawing is designed for the purpose of illustration only, and not as a definition of the limits of the invention.

In the drawing wherein similar reference characters denote similar elements throughout the several views.

DETAILED DESCRIPTION OF THE PREFERRED EMBODIMENT

Turning now in detail to the drawings, the apparatus for producing the multi-layered confectionery includes several applicators, shown as extruders 1, 1' and 1", which are arranged above a conveyor system, shown as a conveyor belt 2. Each of the extruders 1, 1' and 1" has on its underside a number of outlet nozzles 3, 3' and 3" which make it possible with each working thrust to extrude at least one row of confectionery layers 4, 4' and 4". These layers are aligned at right angles to the transport direction of the conveyor belt 2. As can be seen, the conveyor belt 2 moves in the direction of the arrow x from left to right. It transports the confectionery products produced from one extruder, to the next extruder, in order to finally pass the finished products to a succeeding apparatus, e.g., packaging machinery, which is not shown.

The confectionery products produced include, for example, cookies, cakes or pastries which may be topped with such coatings as powdered sugar, chocolate, honey nuts or berries.

In order to make time for the extrusion operation and to avoid distortions of shape, during the extrusion operation the extruders 1, 1' and 1" move a little with the conveyor belt 2, also moving at the speed of the belt.

Figure 1:
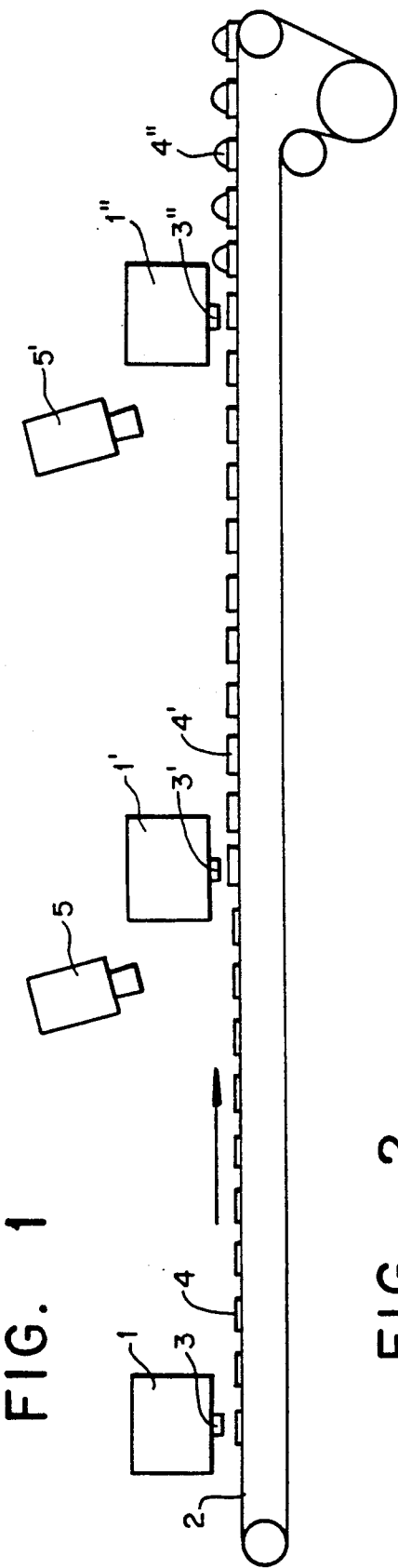
FIG. 1 shows the side view of an apparatus for producing multi-layered confectionery according to the invention.
Figure 2:
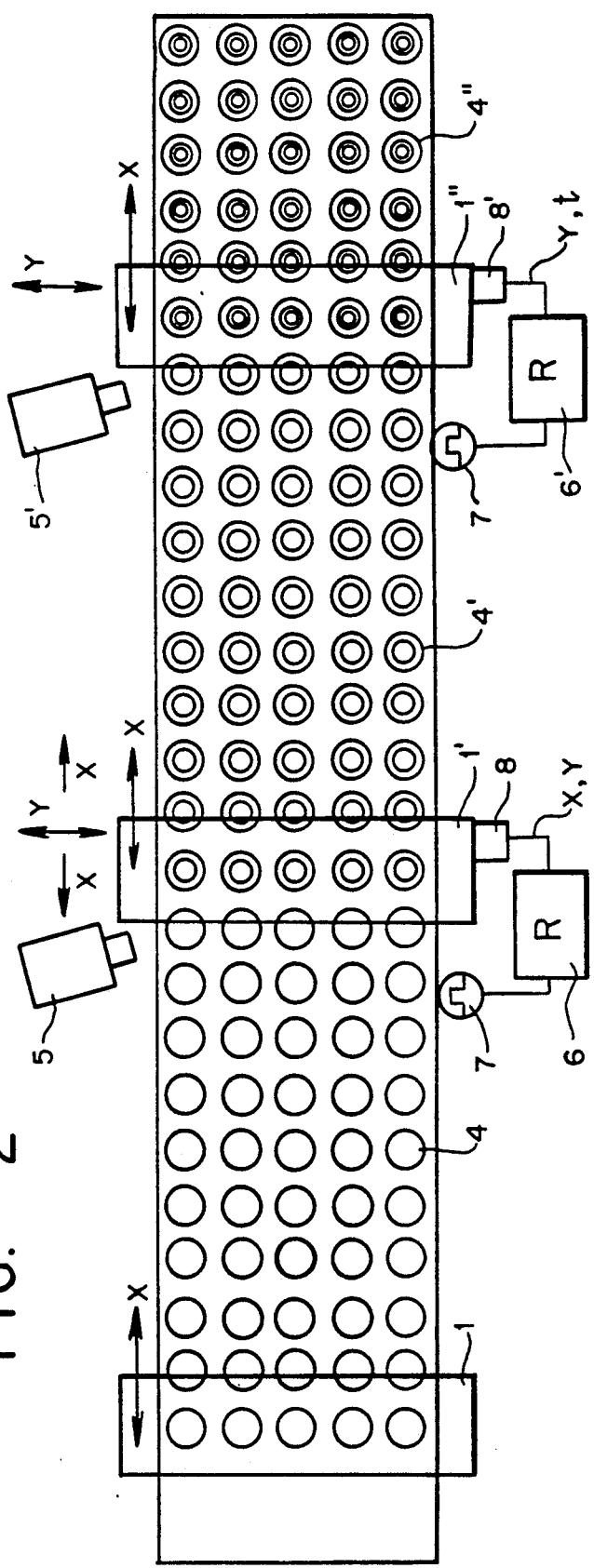
FIG. 2 shows a top view of the apparatus of FIG. 1.

After delivering the confectionery mass, they return immediately to their starting position in order to be ready for the formation of the next row. This movement of the extruders to and fro is indicated in FIG. 2 by double headed arrows running in the x direction.

According to the present invention, there is the automatic adaptation of the spatial position of the extruders 1', 1" to the position of the confectionery layers 4, 4'. For this purpose, an optical scanning arrangement, such as an electronic line camera 5 or 5', is arranged in the inlet region of each of the extruders 1' or 1". In short time intervals of, for example, 0.01 seconds, it scans the position of the confectionery rows 4 or 4' shortly before they pass below the extruders 1' and 1" and transmits the information thus obtained to a computer 6 or 6'. Thus, in the computer 6 or 6', a complete picture is built up line by line for each row of confectionery. From this, and from the knowledge of the position of the extruders 1' or 1" at that moment, the computer 6 or 6' both can recognize any possible lateral displacement of the confectionery row 4' or 4" and can determine its distance in the direction of movement of the conveyor belt 2 from the extruder nozzles 3' or 3".

In cooperation with a motion detector device 7 which detects the belt speed and transmits it to the computer 6 or 6', the computer determines the exact position which the extruder 1' or 1" must occupy in order to deliver the confectionery material exactly onto the layer of confectionery passing below it. A signal generated by the computer 6 by comparison of the actual and theoretical positions actuates an adjusting device 8, which is conventional and, thus, not shown in greater detail. Device 8 moves the extruder 1' into the desired position as indicated by arrows in the x and y directions. In this case, the correction movement of the extruder 1' in the belt travel direction is superimposed upon its forward and backward movement. The extruder carries out the forward and backward movement in any case during the extrusion operation, as is indicated by the single arrows in the x direction which are drawn in addition to the double arrows x and y. These two sets of arrows indicate the two kinds of movements.

In another embodiment, it is provided for the extruders to be positioned only in the y direction, i.e., at right angles to the direction of travel of the conveyor belt 2 in conformity with the position of the confectionery. The adaptation of the position in the x direction, i.e., in the direction of travel of the conveyor belt, occurs indirectly. It is achieved under the control of the computer 6 based upon the duration of the extrusion operation, here by means of the time of the beginning of the movement of the extruder 1" together with the conveyor belt 2.

In FIG. 2 this is indicated by "y" and "t" in the control line between the computer 6 and the adjusting device 8', as well as by a double arrow in the x direction on the extruder 1" of equal length to that on the extruder 1.

While only two embodiments of the present invention have been shown and described, it is to be understood that many changes and modifications may be made thereunto without departing from the spirit and scope of the invention as defined in the appended claims.

What is claimed is:

1. A method for producing multi-layered confectionery comprising:
   aligning the confectionery on a conveyor system in rows oriented at right angles to the transport direction of movement of said conveyor system;
   building up the confectionery layer by layer by a first, a second and succeeding applicators for delivering a confectionery mass deposited onto the confectionery, said applicators being arranged one behind the other along the transport direction;

optically detecting each row of confectionery before said row reaches the second and all succeeding applicators;

generating a signal based upon the position of each row relative to the respective applicator; and controlling the spatial position of the respective applicator and its application time interval by said signal in such a way that the delivered mass deposited by the applicator is placed exactly in a predetermined position onto the row of confectionery passing below said applicators.

2. The method as claimed in claim 1, further comprising:

correcting the spatial position of each applicator both at right angles to the direction of, and in the direction of, travel of the conveyor system.

3. The method as claimed in claim 1, further comprising:

correcting the spatial position of each applicator only at right angles to the direction of travel of the conveyor system; and correcting the direction of travel of the conveyor system indirectly by altering the temporal position of the applicator operation.

4. The method as claimed in claim 1, wherein the confectionery comprises individual pieces of multi-layered confectionery.

* * * * *